(12) United States Patent
Chang et al.

(10) Patent No.: US 7,312,605 B2
(45) Date of Patent: Dec. 25, 2007

(54) AC POWER SUPPLY TESTING MODULE AND METHOD FOR BOOTING A MAIN BOARD

(75) Inventors: Kun Sheng Chang, Taoyuan County (TW); Pao Jen Chen, Taipei (TW); Anpang Hsieh, Taipei (TW); Li An Huang, Taoyuan County (TW)

(73) Assignee: Lite-On Technology Corp., Taipei (TW)

( * ) Notice: Subject to any disclaimer, the term of this patent is extended or adjusted under 35 U.S.C. 154(b) by 22 days.

(21) Appl. No.: 11/278,946

(22) Filed: Apr. 6, 2006

(65) Prior Publication Data
US 2007/0075728 A1    Apr. 5, 2007

(30) Foreign Application Priority Data
Sep. 30, 2005    (TW) .............................. 94134378 A

(51) Int. Cl.
G01R 31/28    (2006.01)
(52) U.S. Cl. .................................. 324/158.1
(58) Field of Classification Search ................ 324/765, 324/158.1, 760; 340/645; 361/96; 702/60–62, 702/65, 118; 710/305; 713/340, 300
See application file for complete search history.

(56) References Cited

U.S. PATENT DOCUMENTS

| | | | | |
|---|---|---|---|---|
| 5,467,025 A | * | 11/1995 | Ray | 324/772 |
| 6,298,447 B1 | * | 10/2001 | Wang | 726/36 |
| 6,677,777 B2 | * | 1/2004 | Dongowski et al. | 324/771 |

* cited by examiner

Primary Examiner—Ha Tran Nguyen
Assistant Examiner—Tung X. Nguyen

(57) ABSTRACT

An AC power supply testing method upon booting a main board is provided. The testing method is applied to a main board, a microprocessor is in connection with the main board, and a relay is connected with the microprocessor, an AC power supply and a system power supply of the main board. The testing method includes steps of (1) configuring a system power on/off time of the microprocessor; (2) counting down the system power on/off time; (3) determining the current state of the relay; (4) shutting off the relay and resuming executing step (1) if the current state is ON; and (5) executing a power supply testing upon booting if the current state is OFF.

8 Claims, 3 Drawing Sheets

AC POWER SUPPLY TESTING MODULE AND METHOD FOR BOOTING A MAIN BOARD

FIELD OF THE INVENTION

The invention relates to a power supply testing method for a main board, and more particularly to an AC power supply testing method for booting a main board using a microprocessor and a General-Purpose Input Output (GPIO) device on the main board.

BACKGROUND OF THE INVENTION

During the development stage, numerous tests spending long hours must be carried out to tackle the power sequence designed for the main board. Please refer to FIG. 1, which is a schematic view showing the configuration for conducting the conventional AC power supply testing method for a main board. The configuration includes a main board 1, an external floppy drive 2, an external controller 3, a COM port 4, an I/O interface 5, an AC power supply 6, a system power supply 7, a CPU 8 and a booting memory 9. At present, such power sequence requires to be carried out by means of a floppy drive 2, an external controller 3 and a COM port 4. The power sequence is executed in a way that after the main board 1 is booted as usual, the AC power supply 6 instructed by the controller 3 supplies power to the system power supply 7 to power on the main board and initiate the system. The operating system and the application software in the floppy drive 2 are loaded into the booting memory 9, and the program for counting down the time to power off the system and recording the power-off frequency is executed. Then the CPU 8 issues an interrupt command to the COM port 4 to inform the controller 3 of a power-off execution. After executing the power-off, the controller 3 is controlled by an adjustable resistor to schedule the next booting time. After the power is recovered, the main board automatically boots and branches to the operating system to resume an automatic AC power supply testing procedure. During when, the AC Power Loss among the BIOS setup items is set to be the power-on state.

The aforementioned main board power supply testing method has the following shortcomings. (1) It requires more space due to the use of the external floppy drive 2, the controller 3 and the COM port 4 on the main board 1 and the testing time therefor is longer. (2) It could not be implemented without the Super IO interface on the main board. (3) It supports DOS platform only so that the application thereof is limited. (4) An additional program should be written for the method to cooperate with the testing sequence. (5) It fails to display the countdown testing time, and the setup and error codes lead to an awkward operation upon testing.

Based on the above, in order to overcome the drawbacks in the prior art, the present invention provides an improved method for the AC power supply testing of the main board.

SUMMARY OF THE INVENTION

In accordance with a first aspect of the present invention, an AC power supply testing module for a main board is provided. The provided AC power supply testing module contains a system power source supplying a power to the main board and charged by an AC power source, a switch setting a system power on/off time for discharging the system power source, a relay electrically connected with the system power source and the AC power source and controlling a connection between the system power source and the AC power source depending on a relay state, a plurality of display devices displaying( the system power on/off time and a count down system power on/off time, and a microprocessor electrically connected with the switch, the relay and the plurality of display devices so as to store the system power on/off time, count down the system power on/off time, display the system power on/off time and the count down system power on/off time, control the relay state of the relay, and receive a signal from the main board while an AC power test is carried out.

Preferably, the AC power supply testing module is applied while booting the main board.

Preferably, the switch is a DIP switch.

Preferably, the power on/off time is a period for discharging the system power source from switching on to switching off the main board.

Preferably, the display devices are LED displays.

Preferably, the microprocessor is an 8051 single-chip microprocessor.

Preferably, the AC power supply testing module further contains a General-Purpose Input Output (GPIO) device and a basic input output system (BIOS), and the signal from the main board is issued by the General-Purpose Input Output (GPIO) device thereof driven by the BIOS.

In accordance with a second aspect of the present invention, an AC power supply testing method for a system having a main board with a system power source, a microprocessor electrically connected with the main board and a relay electrically connected with the microprocessor, an AC power source and the system power source is provided. The provided AC power supply testing method contains steps of setting up and then reading a system power on/off time of the microprocessor, counting down the system power on/off determining a current state of the relay and then performing one of steps (d)and (e), shutting down the relay and resuming executing step (b) if the current state of the relay is on, and executing a power test sequence for the main board if the current state of the relay is off.

Preferably, the AC power supply testing module is applied while booting the main board.

Preferably, the step (b) contains steps of (b1) counting down the system power on/off time, (b2) displaying a count down system power on/off time,(b3) determining the count down system power on/off time carried out in the microprocessor and then performing one of steps (b4) and (b5), (b4) executing step (c) if the count down system power on/off time is zero, and (b5) resuming executing the step (b3) if the count-down system power on/off time is not zero.

Preferably, the step (b1) further contains a step of utilizing a first display device electrically connected with the microprocessor to display the system power on/off time.

Preferably, the step (b2) contains a step of utilizing a second display device electrically connected with the microprocessor to display the count-down system power on/off time.

Preferably, the microprocessor in the step (c) continuously detects the current state of the relay.

Preferably, the main board has a General-Purpose Input Output (GPIO) device electrically connected with the microprocessor and a read-only memory device having a BIOS, and the step (e) further comprises steps of (e1) activating the reply, (e2) supplying an AC power source to the system power source of the main board via the relay, (e3) conducting a test on the system power source of the main board, (e4) determining if the test in the step (e3) is finished or not and then performing one of steps (e4) and (e5), (e5) diagnosing the system power source until a diagnostic process is completed if the test in the step (e4) is interrupted, and (e6) driving the GPIO device with the BIOS to send a signal to the microprocessor so as to inform the microprocessor of a completion of the test.

Preferably, the microprocessor resumes the step (b) after detecting the signal.

The foregoing and other features and advantages of the present invention will be more clearly understood through the following descriptions with reference to the drawing, wherein:

DETAILED DESCRIPTION OF THE PREFERRED EMBODIMENT

Figure 1:
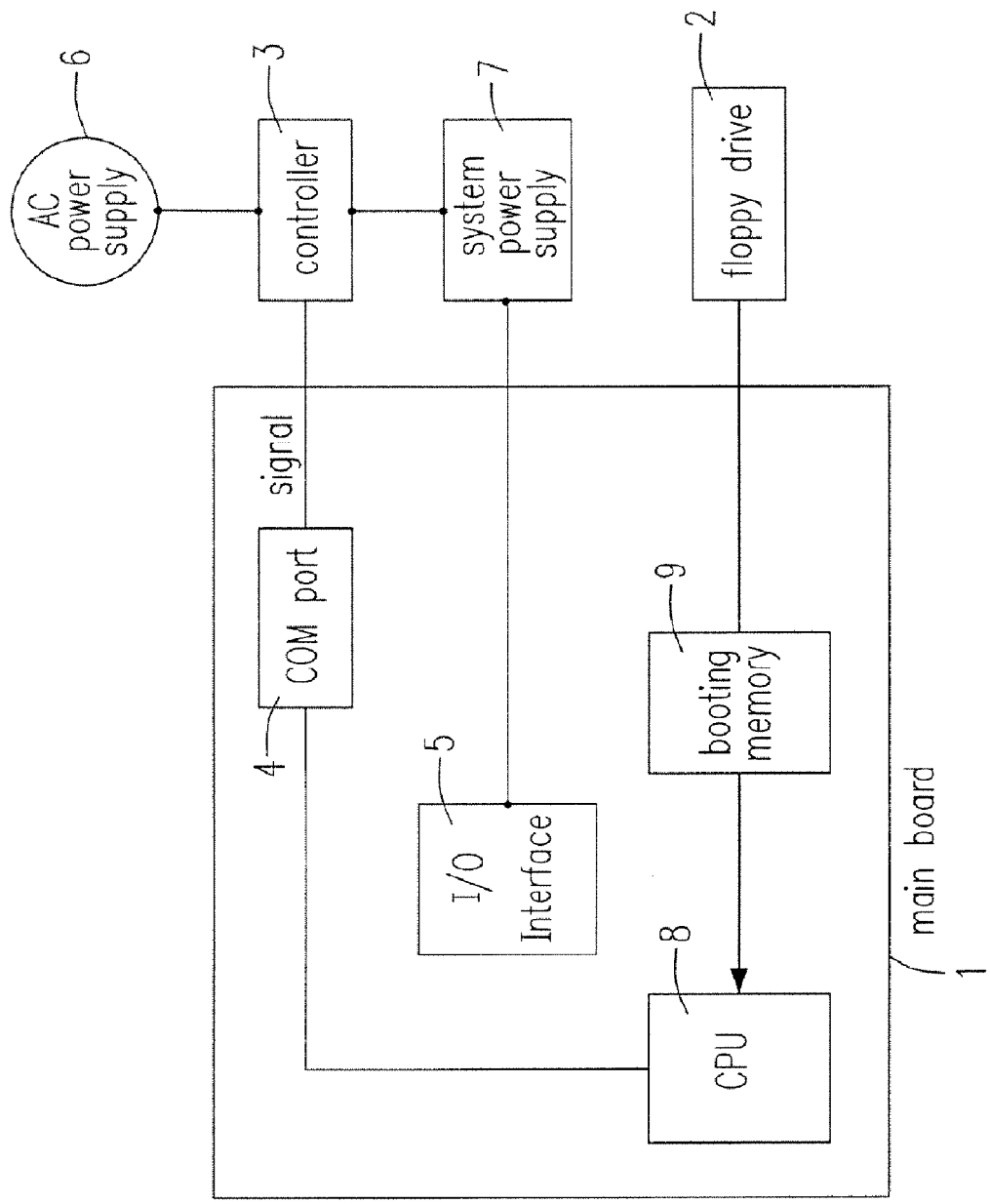
FIG. 1 is an schematic view showing the configuration for conducting the conventional AC power supply testing method for a main board.

The present invention will now be described more specifically with reference to the following embodiments. It is to be noted that the following descriptions of preferred embodiments of this invention are presented herein for purposes of illustration and description only; it is not intended to be exhaustive or to be limited to the precise form disclosed. Please refer to FIG. 2, which is a block diagram showing the AC power supply testing circuit for a main board in the preferred embodiment of the present invention. The AC power supply circuit includes a single-chip 8051 microprocessor 21, a relay 22, a main board 23, an AC power supply 24, a system power supply 25, two LED display devices 26 and a DIP switch 27. The single-chip 8051 microprocessor 21 is connected with the DIP switch 27, the two LED display devices 26, the relay 22 and the GPIO device on the main board. The relay 22 is also connected with the AC power supply 24 and the system power supply 25. The DIP switch 27 is used to configure a system power on/off time in the single-chip 8051 microprocessor 21 in consideration of a specific time required for the power contained in a capacitor of the system power supply 25 to be fully discharged between a power-off state and a power-on state. The single-chip 8051 processor 21 functions as the coordinating part for the AC power supply testing upon booting, and is responsible for storing the system power on/off time, displaying the system power on/off time on the LED display device 26, counting down the system power on/off time, controlling the on/off of the relay 22, and receiving a signal from the main board 23 to inform it of the successful completion of the AC power supply testing. The relay 22 functions as a channel between the AC power supply 24 and the system power supply 25. The AC power supply 24 can only supply power to the system power supply 25 of the main board 23 when the relay 22 is at an ON state. Then the system power supply 25 supplies power to the main board 23, and the booting procedures and the AC power supply testing are carried out. When the AC power supply testing is completed, the BIOS (not shown) drives the GPIO device to send a signal to the single-chip 8051 microprocessor 21 for notification.

Figure 2:
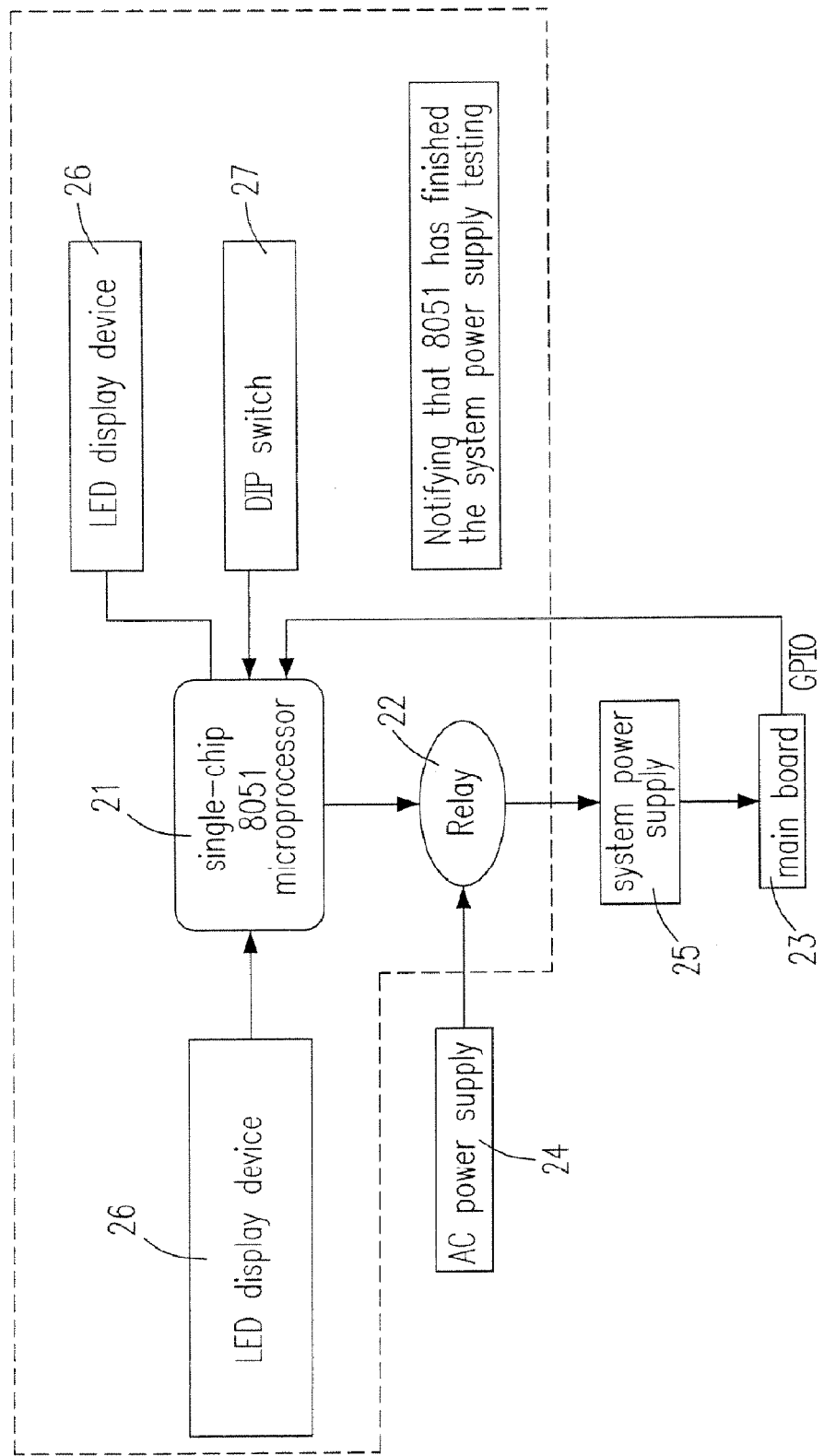
FIG. 2 is a block diagram showing the AC power supply testing circuit for a main board in the preferred embodiment of the present invention.

The components included by dash lines shown in FIG. 2 and the corresponding functions are mastered by the single-chip 8051 microprocessor 21. What the single-chip 8051 microprocessor 21 replaces in the conventional AC power supply testing configuration is the function of the controller 3 in FIG. 1. Meanwhile, the floppy driver 2 and the COM port 4 are also eliminated. Instead, new components such as the GPIO device and the relay 22 are introduced. In addition to the structural difference, the functions between FIG. 1 and FIG. 2 differ in that (1) the single-chip 8051 microprocessor 21 has more precise control over time, not only reading the power on/off time upon booting and displaying the count-down value of the power on/off time, controlling the timing and ensuring the event occurrence when the time is out, but also utilizing the relay 22 to precisely control the ON and OFF states of the AC power supply 24; (2) the BIOS directly controls the GPIO device so as to support the main board 23 having no Super IO interface; (3) the BIOS provides a single-step diagnostic procedure specific to the respective chipset and the components dedicated for the control over the AC power loss of the chipsets; (4) the large voltage and small voltage in the circuit are isolated and converted. Due to the existence of the relay 22, when the main board 23 is switched off and the AC power supply (110V) is not supplying power, the power left in the capacitor of the system power supply 25 can still be supplied to components operated with small voltages (3V, 5.5V, 12V, etc.). When a system power on/off time expires, the residual power in the capacitor is roughly used up. In the meantime, the relay 22 is switched on so that the AC power supply 24 supplies power to the system power supply 25. As such, the large voltage and small voltage in the circuit can be isolated and converted, thereby ensuring a safe operation of the circuit.

Figure 3:
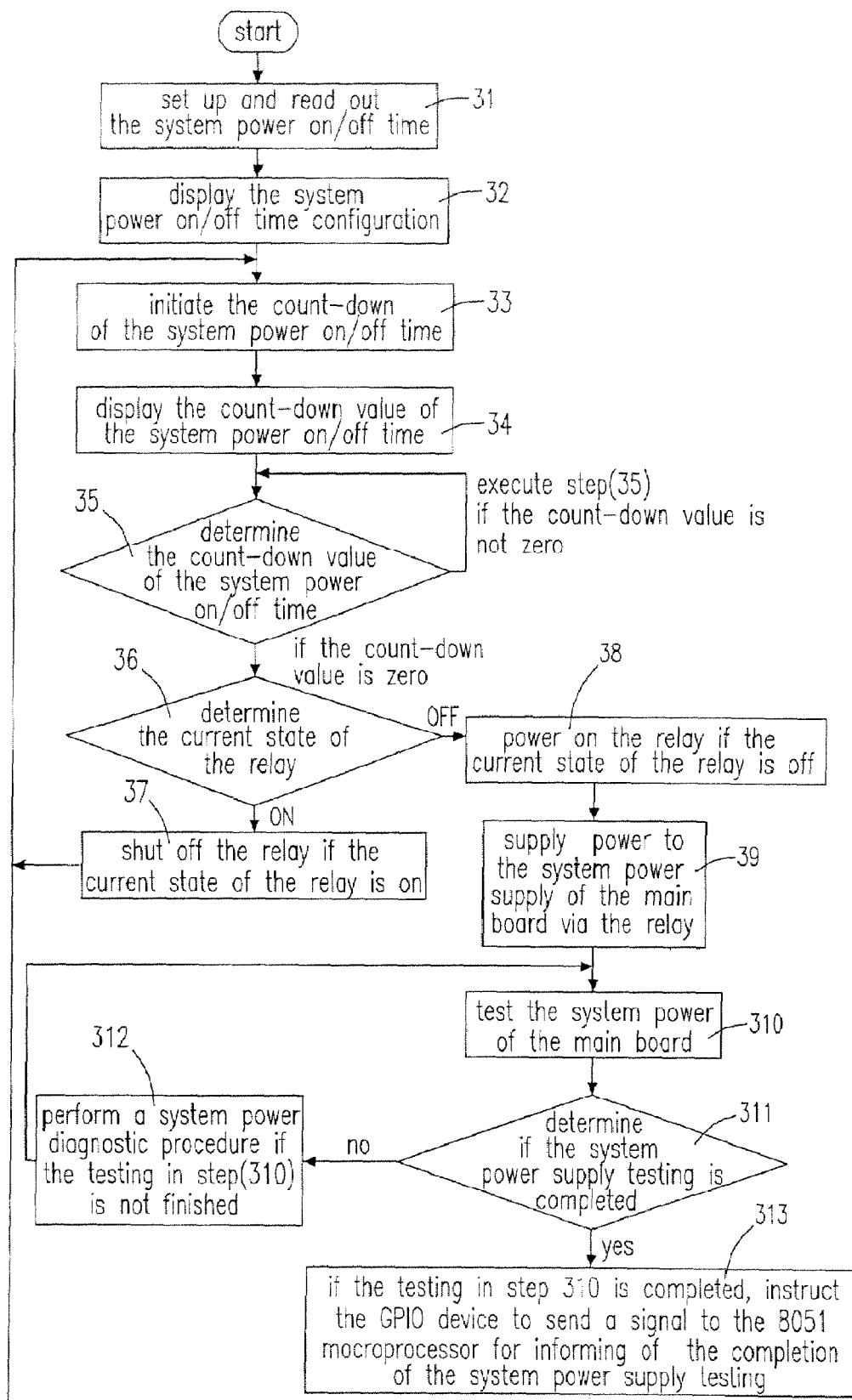
FIG. 3 is a flow diagram showing the AC power supply testing method for a main board in the preferred embodiment of the present invention.

Please refer to FIG. 3, which is a flow diagram showing the AC power supply testing method for a main board in the preferred embodiment of the present invention. The AC power supply testing method includes the following steps: (1) The system power on-off time is set up and read out (step 31), in this step, the DIP switch can be used to set up the required system power on/off time in the single-chip 8051 microprocessor for it to read; (2) The system power on/off time is displayed (step 32); in this step, the single-chip 8051 microprocessor displays the system power on/off time on an LED display device; (3) The count-down of the system power on/off time is initiated; in this step, the single-chip 8051 microprocessor initiates its timer to count down the system power on/off time (step 33); (4) The count-down value of the system power on/off time is displayed (step 34); in this step, the single-chip 8051 microprocessor displays the real-time count-down value of the system power on/off time on the other LED display device; (5) The count-down value of the system power on/off time is determined (step 35); this step fulfills a logic judgment on the real-time count-down value of the system power on/off time; (6) The step (35) is executed if the count-down value of the system power on/off time is not zero; (7) The current state (ON/OFF) of the relay is determined if the count-down value of the system power on/off time in step (35) is zero (step 36); (8) The relay is shut off if the current state of the relay is ON (step 37) and then the step (33) is executed; the consideration of shutting off the relay is to ensure that the residual system power of the main board is fully consumed and/or released under the condition that the AC power supply supplies no power; (9) The relay is powered on if the current state of the relay is OFF (step 38); (10) The AC power supply is used to supply power to the system power supply of the main board via the relay (step 39); in this step, as the relay is switched on, the AC power supply automatically supplies power to the main board; (11) The system power supply of the main board is tested (step 310); in this step, the system power supply testing procedures for each chipset and the relevant components on the main board are carried out; (12) Whether the system power supply testing is completed is determined (step 311); in this step, the testing can be deemed completed unless the power supply testing for all chipsets and the relevant components are all passed; (13) A system power diagnostic procedure is performed if the testing in step 310 is not finished (step 312); in this step, the power supply testing procedure stays at an idle state, detect the error manually and with instruments and perform debugging; after the error is identified and corrected, skip the idle state and return to step 310; basically, the aforementioned procedures can form a Single-Step Diagnostics; (14) The BIOS on the main board is used to instruct the GPIO device on the main board to send a signal to the 8051 microprocessor for reporting the completion of the system power supply testing if the testing in step 310 is completed (step 313); and (15) jump back to step (33).

In summary, the present invention provides a design using an external single-chip 8051 microprocessor and an external relay to address an AC power supply testing method upon booting a main board, which is free of the COM port and floppy drive, so as to control the GPIO device on the main board using the BIOS. In contrast to the prior art designed with a controller, a floppy drive and a COM port, the AC power supply testing method of the present invention saves the space allocated for testing, operates without additional programs, supports various operating platforms, shortens the testing time by closely controlling the testing progress with the testing status displayed on the LED display device through the 8051 microprocessor, and provides a single-step diagnostic means during the testing procedures to clearly isolate and solve the issues on a step-by-step basis. Consequently, the simplification of the circuit configuration, the compact size implemented by the single-chip design, good performance and low cost make the present invention innovative, progressive and practical.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. An AC power supply testing method for a system having a main board with a system power source, a microprocessor electrically connected with said main board and a relay electrically connected with said microprocessor, an AC power source and said system power source, comprising steps of:
   (a) setting up and then reading a system power on/off time of said microprocessor;
   (b) counting down said system power on/off time;
   (c) determining a current state of said relay and then performing one of steps (d) and (e);
   (d) shutting down said relay and resuming executing step (b) if said current state of said relay is on; and
   (e) executing a power test sequence for said main board if said current state of said relay is off.

2. The AC power supply testing method of claim 1 being applied while booting said main board.

3. The AC power supply testing method of claim 1 for booting said main board, wherein said step (b) comprises steps of:
   (b1) starting a countdown of said system power on/off time;
   (b2) displaying said countdown of said system power on/off time;
   (b3) determining said countdown of said system power on/off time carried out in said microprocessor and then performing one of steps (b4) and (b5);
   (b4) executing said step (c) if said countdown of said system power on/off time is zero; and
   (b5) resuming executing said step (b3) if said countdown of said system power on/off time is not zero.

4. The AC power supply testing method of claim 3, wherein said step (b1) further comprises a step of utilizing a first display device electrically connected with said microprocessor to display said system power on/off time.

5. The AC power supply testing method of claim 3, wherein said step (b2) further comprises a step of utilizing a second display device electrically connected with said microprocessor to display said countdown of said system power on/off time.

6. The AC power supply testing method of claim 1, wherein said microprocessor in said step (c) continuously detects said current state of said relay.

7. The AC power supply testing method of claim 1, wherein said main board has a General-Purpose Input Output (GPIO) device electrically connected with said microprocessor and a read-only memory device having a BIOS, and said step (e) further comprises steps of:
   (e1) activating said reply;
   (e2) supplying said AC power source to said system power source of said main board via said relay;
   (e3) conducting a test on said system power source of said main board;
   (e4) determining if said test in said step (e3) is finished or not and then performing one of steps (e5) and (e6);
   (e5) diagnosing said system power source until a diagnostic process is completed if said test in said step (e4) is interrupted; and
   (e6) driving said GPIO device with said BIOS to send a signal of a completion of said test to said microprocessor if said test in said step (e4) is finished.

8. The AC power supply testing method of claim 7, wherein said microprocessor resumes said step (b) after detecting said signal.

* * * * *